United States Patent

Mioduski

[15] 3,675,051

[45] July 4, 1972

[54] HAND PROXIMITY ALARM CONTROL CIRCUIT

[72] Inventor: George T. Mioduski, Houston, Tex.

[73] Assignee: General Electric Company

[22] Filed: June 24, 1970

[21] Appl. No.: 49,448

[52] U.S. Cl. ..................................307/308, 328/5, 307/293, 340/258 C

[51] Int. Cl. ..........................................................H03k 17/00

[58] Field of Search ...............328/5; 340/258 C; 317/DIG. 2; 307/304, 308, 290, 293

[56] References Cited

UNITED STATES PATENTS

| | | | |
|---|---|---|---|
| 3,492,542 | 1/1970 | Atkins | 328/5 X |
| 3,276,005 | 9/1966 | Quist et al. | 340/258 C |
| 3,300,585 | 1/1967 | Reedyk et al. | 307/304 X |
| 3,255,380 | 6/1966 | Atkins et al | 328/5 |
| 3,158,757 | 11/1964 | Rywak | 307/293 X |
| 3,553,488 | 1/1971 | Darrow | 328/5 X |

OTHER PUBLICATIONS

Multivibrator Provide Short Pulses, Wide Spacing, by Pfeiffer, Electronics 4/67.

*Primary Examiner*—Donald D. Forrer
*Assistant Examiner*—B. P. Davis
*Attorney*—Marvin A. Goldenberg, W. J. Shanley, Jr., Frank L. Neuhauser, Oscar B. Waddell and Joseph B. Forman

[57] ABSTRACT

A hand proximity alarm control circuit having principal application to a clock radio receiver, for turning off the radio for a brief period by simply the wave of a hand once it has come on in response to an alarm signal. Said circuit operates through a capacitive coupling, provided by placing the hand or other object close to the radio, to trigger an oscillator which is coupled to a timing circuit and bi-stable network for inhibiting the radio's audio amplifier stage. A feedback connection from the bi-stable network output to the oscillator input inhibits further triggering of the oscillator until said brief period has ended. The present control circuit may also have use with other forms of electronic devices in addition to radio receivers for temporarily modifying their operation.

7 Claims, 2 Drawing Figures

INVENTOR:
GEORGE T. MIODUSKI,

BY Marvin L. Goldenberg
HIS ATTORNEY.

HAND PROXIMITY ALARM CONTROL CIRCUIT

BACKGROUND OF THE INVENTION

The invention pertains to the field of electronic control circuitry and particularly to control circuitry that may be actuated by the coupling of body capacitance.

Many present day clock radio receivers include alarm control circuitry of the type which operates to inhibit the audio output for a brief period after the radio has come on in response to an alarm set, the radio again turning on after the expiration of said period. This operation, which permits a person two or more opportunities to respond to the alarm, is normally controlled by a manually actuated mechanical switch for driving a mechanical timing mechanism. A conscious effort and deliberate physical motion is required for actuating a mechanical switch, in the turning of a knob, depressing of a button, etc., which is an undesirable feature for performing the described audio inhibit function. The present invention is intended to overcome this limitation and permit operation of the audio inhibit function with minimum effort, by means of a capacitive coupling proximity device.

Proximity or touch responsive devices that employ a capacitive coupling between some part of the body or other object and a circuit to be controlled have been known for many years. For example, they have been used for the on-off operation of lamps, as switches in self-operated elevators and for sundry other purposes. However, insofar as known, they have not been employed for controlling timing operations as in a clock radio receiver, and particularly not with respect to alarm control circuitry in the novel manner of the present invention.

OBJECTS

It is accordingly an object of the invention to provide a novel control circuit for use with an electronic device which operates to modify the operation of said device for a brief period of time without the requirement for a mechanical switch.

It is a further object of the invention to provide a novel control circuit as above described which is operated in response to a capacitive coupling by movement of the hand or other object in proximity with said electronic device.

It is yet another object of the invention to provide a novel control circuit as above described in which the modified operation cannot be reset during said brief time period.

It is another, more specific object of the invention to provide a novel alarm control circuit as described for controlling the audio output of a clock radio receiver.

SUMMARY OF THE INVENTION

In accordance with these and other objects of the invention, there is provided a hand proximity control circuit for temporarily modifying the operation of an electronic device and, in particular, for inhibiting the audio amplifier stage of a radio receiver, the operation of said circuit being initiated by a capacitive coupling established by the hand or other object of comparable capacitance coming into proximity or contact with the radio receiver. By means of said capacitive coupling an oscillator circuit is triggered into oscillation. The resulting energy is rectified and applied to charge a timing capacitor. The capacitor is coupled to the input of the bi-stable network and upon becoming charged to a sufficient voltage exceeding a given threshold level causes said bi-stable network to change from a first output state to a second output state. The output of said bi-stable network is coupled to said audio amplifier stage, permitting its operation for said first output state and inhibiting its operation for said second output state. After a brief time period, determined by the time constant of the capacitor circuit, the capacitor charges below said threshold level, and the bi-stable network changes to its first output state. A feedback connection is provided between the output of said bi-stable network and the input to said oscillator for preventing further triggering of the oscillator during said brief time period.

DESCRIPTION OF THE DRAWINGS

While the specification concludes with the claims particularly pointing out and distinctly claiming subject matter which is regarded as invention, it is believed that the invention will be better understood from the following description taken in connection with the accompanying drawings in which:

DESCRIPTION OF THE PREFERRED EMBODIMENT

Figure 1:
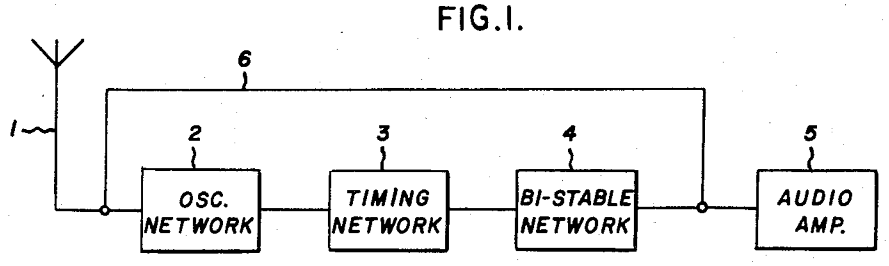
FIG. 1 is a block diagram of a hand proximity alarm control circuit in accordance with the invention.

With reference to FIG. 1, there is illustrated a hand proximity alarm control circuit which includes an antenna 1 for providing capacitive coupling to an oscillator network 2. The output of the oscillator network 2 is connected to a timing network 3, the output of which is coupled to a bi-stable network 4. The output of the bi-stable network 4 is connected to the first stage of an audio amplifier 5, and is also fed back to the input of the oscillator 2 by means of conductor 6.

The operation of the circuit is as follows. In response to a capacitive coupling applied to the antenna 1, such as by moving the hand in proximity with said antenna, the oscillator 2 is triggered into oscillations. Energy from the oscillator is fed to the timing network 3, which in turn actuates the bi-stable network 4 from a first output state into a second output state. The second output state applies a signal to the audio amplifier 5 for inhibiting its operation. The feedback connection through conductor 6 applies a signal to the input of the oscillator 2 which prevents the circuit from oscillating so long as the bi-stable network 4 is in the second output state. Thus, should a subsequent capacitive coupling be made to antenna 1, oscillations will fail to be generated. After a fixed period of time, the timing network 3 applies a signal to the bi-stable network which changes its output state back to said first state. Said first state releases the audio amplifier, thereby permitting it to function. In addition, the feedback connection to the oscillator now permits oscillations to occur in response to a capacitive input through antenna 1. The process can be repeated.

Figure 2:
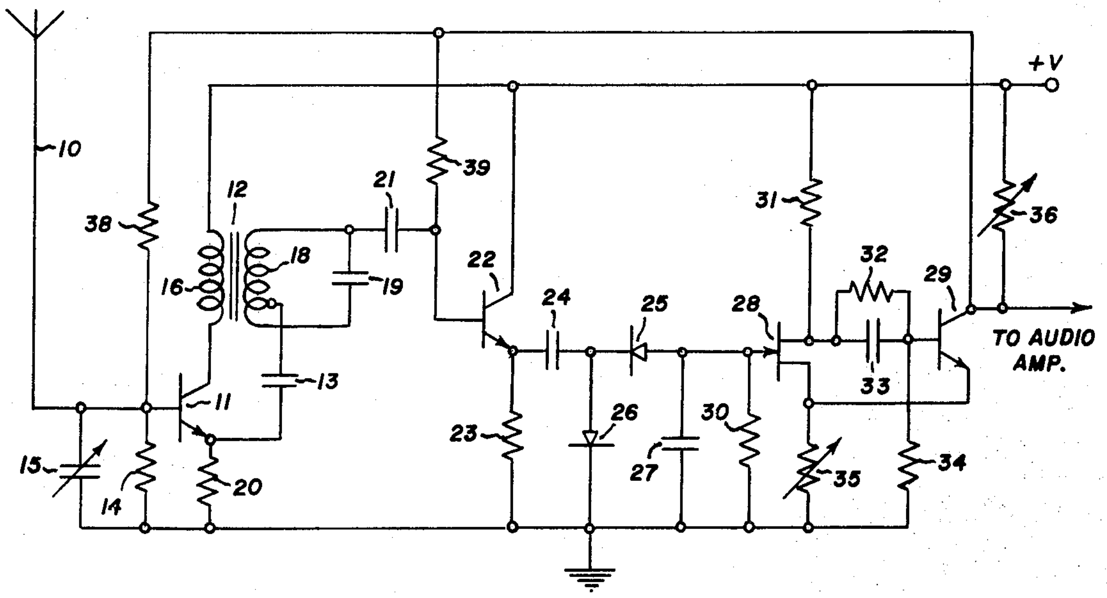
FIG. 2 is a schematic circuit diagram corresponding to the block diagram of FIG. 1.

In FIG. 2 there is illustrated a schematic circuit diagram of a detailed embodiment of the present invention. An antenna 10 for providing capacitive coupling to the circuit is connected to the base of an NPN transistor 11 connected as an oscillator. In the present embodiment a Hartley oscillator configuration is employed. However, it is not intended that the invention be limited to this specific oscillator configuration and other types of oscillators may be employed with similar results. In the present circuit, oscillations are provided by means of a feedback connection between the collector and emitter of the transistor 11 through a transformer 12 and coupling capacitor 13. A bias resistor 14 and variable capacitor 15 are connected in shunt between the base of transistor 11 and ground. The capacitance provided through antenna 10 is effectively in parallel with the capacitor 15. The collector of transistor 11 is connected to one end of the primary winding 16 of transformer 12. The other end of winding 16 is connected to a DC source of positive potential plus V, which may be a regulated voltage supply. A secondary winding 18 of the transformer 12 is connected in shunt with a capacitor 19 to form a tuned circuit. A tap on winding 18 is coupled through capacitor 13 to the emitter of the transistor 11. The emitter is further coupled through a bias resistor 20 to ground. The other end of the tuned circuit is coupled by a capacitor 21 to the base of an NPN transistor 22 connected in an emitter follower configuration. The emitter follower provides minimal loading of the tuned circuit. The collector of transistor 22 is connected to a source plus V, and the emitter is connected through a resistor 23 to ground.

The emitter of transistor 22 is further connected through a coupling capacitor 24 to the junction of a pair of voltage doubling diodes 25 and 26 which are in turn coupled to a timing capacitor 27. One side of the timing capacitor 27 is connected to ground, the other side being connected to the anode of diode 25. The cathode of diode 25 forms a junction with the anode of diode 26, and the cathode of diode 26 is connected to ground. The junction of diode 25 and capacitor 27 is connected to the input of a transistor 28, which in this embodiment is a field effect transistor exhibiting a relatively high input impedance. FET transistor 28 together with an NPN transistor 29 forms a Schmitt trigger network operating in a regenerative bi-stable manner. Although a Schmitt trigger network is desirable for the present circuit application, it may be appreciated that other bi-stable networks of relatively high input impedance may alternatively be employed for providing this function. The input of transistor 28, which is a gate electrode, is connected through a bias resistor 30 to ground, through which capacitor 27 is principally discharged. The drain of transistor 28 is connected through a resistor 31 to the DC potential source, and through the shunt connection of a resistor 32 and a capacitor 33 to the base of transistor 29. The base of transistor 29 is further connected to a bias resistor 34 to ground. The emitter of transistor 29 is joined to the source of transistor 28 and connected through a bias resistor 35 to ground. The collector of transistor 29 which provides the output of the Schmitt trigger is connected through a load resistor 36 to the DC potential source and to the first stage of an audio amplifier. A feedback connection is made from the collector of transistor 29 through a feedback resistor 38 to the base of transistor 11, and to limiting resistor 39 to the base of transistor 22.

The following exemplary circuit components and values are given for the circuit of FIG. 2. It should be appreciated that they are for purposes of illustration and to more particularly describe applicant's circuit and are not intended as a limitation.

| | |
|---|---|
| Capacitor **15** | 2–10 picofarads |
| Capacitor **13** | 3 nanofarads |
| Capacitor **21** | 4 picofarads |
| Transformer **12** | Turns ratio 5:1 |
| Capacitor **24** | 1 nanofarad |
| Capacitor **27** | 8 microfarads |
| Capacitor **33** | 150 picofarads |
| Resistor **14** | 56 kilohms |
| Resistor **20** | 1 kilohm |
| Resistor **23** | 2.2 kilohms |
| Resistor **30** | 22 megohms |
| Resistor **32** | 18 kilohms |
| Resistor **34** | 22 kilohms |
| Resistor **35** | 1.5 kilohms |
| Resistor **36** | 6.3 kilohms |
| Resistor **38** | 82 kilohms |
| Resistor **39** | 390 kilohms |
| Transistors **11**, **22** and **29** | RS–7174 (GE) |
| Field effect transistor **28** | MPF–102 (Motorola) |
| Diodes **25** and **26** | Silicon diodes, 1 picofarad junction capacitance |
| Voltage supply plus V | + 9 volts |

In the operation of the circuit of the FIG. 2, it will be assumed that as an initial condition the transistor 28 is conducting and the transistor 29 is non-conducting so that the Schmitt trigger network is in a first output state for permitting operation of the audio amplifier. A capacitive coupling to the antenna 10, for example, by means of bringing the hand or some other object of comparable capacitance in close proximity to, or touching, said antenna, adds to the capacitance of capacitor 15. The total capacitance between the base of transistor 11 and ground is thereby increased, and the input impedance decreased sufficiently to initiate oscillations of the oscillator circuit. In the present embodiment the added capacitance may be in the order of ½–1 pico farad. The oscillations are amplified by the emitter follower 22 and rectified by the voltage doubling diodes 25 and 26 so as to develop a negative charge across the capacitor 27. When the voltage across the capacitor exceeds, in the negative direction, a given threshold level of the Schmitt trigger network the transistor 28 ceases its conduction This threshold level may be typically in the order of 1 – 2 volts. Turn off of transistor 28 raises the voltage at the base of transistor 29 and causes said transistor to conduct. The output of the Schmitt trigger is thereby switched to the second output state which applies a negative signal to the audio amplifier for inhibiting its operation. Said negative signal is also fed back to the base of the transistor 11 for preventing the circuit from oscillating for as long as the second output state exists. A further feedback connection to transistor 22 maintains this transistor cutoff during this time.

After a fixed interval of time, e.g., in the order of 5 – 10 minutes, determined principally by the time constant of the capacitor 27 and the resistor 30 through which the capacitor discharges, the voltage across the capacitor 27 will decrease below the threshold level and cause the transistor 28 to once again conduct. Conduction of transistor 28 causes the transistor 29 to cease conduction, changing the output of the Schmitt trigger back to the first output state. Thus, the output becomes positive and no longer inhibits the audio amplifier. In addition, the feedback connection to the transistor 11, and to transistor 22, is now such as to permit oscillation in response to an input to the antenna 10.

It may be noted that the feedback connection between the bi-stable network output and the transistors 11 and 22 prevent oscillations from occurring during the brief time period that the audio output is silenced. Accordingly, during this period the inhibit function cannot be inadvertently reset. If desired, additional charge and discharge paths may be alternatively coupled to the capacitor 27 by means of, e.g., manually actuated mechanical switches, for overriding the control effected by the present circuit.

It should also be clear that the control signal generated at the output of the present control circuit need not be restricted to controlling the audio output of a radio receiver, but may be applied more generally to control or modify the operation of other electronic devices.

What is claimed as new and desired to be secured by Letters Patent of the United States is:

1. A control circuit comprising:

a. an oscillator network, which by virtue of its impedance properties is in a normally nonoscillatory state b. control means for initiating oscillations in said oscillator network by modifying said impedance properties, c. timing network for generating an analog signal of a given period determined by the parameters of said timing network, d. means for coupling the output of said oscillator network to said timing network for initiating its operation, e. a bi-stable network exhibiting a given input threshold level and first and second output states, the output of said bi-stable network providing a control function, f. means for coupling said analog signal to said bi-stable network for establishing a first output state in response to analog signal magnitudes below said threshold level and a second output state in response to analog signal magnitudes above said threshold level, and g. means for coupling the output of said bi-stable network to said oscillator network for inhibiting the generation of oscillations by said control means when said bi-stable network is in one of its output states.

2. A control circuit as in claim 1 in which said control means includes proximity means responsive to an object that is capacitively coupled thereto for modifying the capacitance of said oscillator network.

3. A control circuit as in claim 2 in which said timing network comprises a capacitor, rectifier means for charging said capacitor in response to oscillations of said oscillator network and resistor means for discharging said capacitor upon cessation of said oscillations, the duration of said given period being determined principally by the time constant of said capacitor and said resistor means.

4. A control circuit as in claim 3 in which said oscillator network comprises a transistor device having base, emitter and collector electrodes, said proximity means being coupled to said base for modifying the input capacitance to said transistor.

5. A control circuit as in claim 4 in which the output of said bi-stable network is coupled back to said base electrode.

6. A control circuit as in claim 5 in which said bi-stable network comprises a Schmitt trigger.

7. A control circuit as in claim 6 in which said Schmitt trigger includes an input device in the form of a relatively high input impedance field effect transistor and an output device in the form of a junction transistor.

* * * * *